J. H. LAU.
WHEEL.
APPLICATION FILED MAY 29, 1908.
951,687.
Patented Mar. 8, 1910.
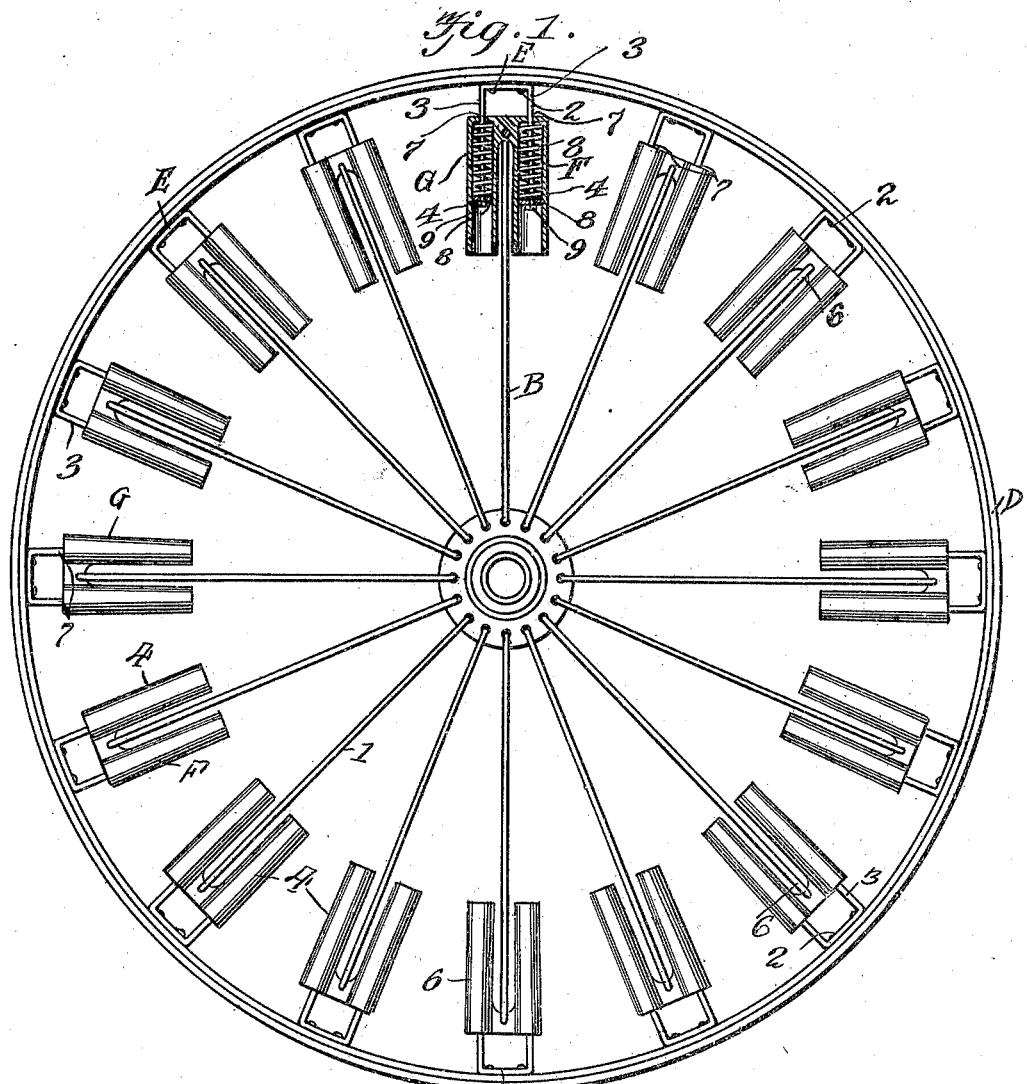
Inventor
John H. Lau
By Victor J. Evans
Attorney
Witnesses
Frank B. Hoffman
Irving J. King

UNITED STATES PATENT OFFICE.

JOHN H. LAU, OF HARRISBURG, PENNSYLVANIA.

WHEEL.

951,687.      Specification of Letters Patent.      Patented Mar. 8, 1910.

Application filed May 29, 1908. Serial No. 435,667.

*To all whom it may concern:*

Be it known that I, JOHN H. LAU, a citizen of the United States, residing at Harrisburg, in the county of Dauphin and State of Pennsylvania, have invented new and useful Improvements in Wheels, of which the following is a specification.

This invention relates to improvements in vehicle wheels, and its primary object is to provide a wheel designed to obviate the necessity of the use of a pneumatic tire, the invention comprehending a vehicle wheel which will possess the resilient and traction qualities of a pneumatic tire, but will not possess the danger, annoyance and expense incident to the use of a pneumatic tire.

A further object of my invention is the provision of a vehicle wheel of the above stated character which is simple, durable and efficient and which may be manufactured at a comparatively low cost.

With the above and other objects in view, as will appear as the description proceeds, the invention comprises the various novel features of construction and arrangement of parts which will be more fully described hereinafter and set forth with particularity in the claim appended hereto.

In the accompanying drawings, which illustrate one of the embodiments of the invention, Figure 1 is a view in side elevation of a vehicle wheel constructed in accordance with my invention. Fig. 2 is an end view partly in section.

Referring to the drawings by reference characters A designates the hub, B the spokes, C the felly, and D the tire of a wheel constructed in accordance with my invention. Each spoke is substantially V-shaped, and the free or inner ends of the members 1 thereof are secured in the usual manner to the hub A. The united or outer ends of the members 1 of each spoke are resiliently secured to the felly C.

The means for resiliently securing the outer end of each spoke B to the felly C, consists of an attaching element E, expansible coiled springs F and a housing G Each attaching element E is U-shaped, and secured to the inner side of the felly C through the medium of its connecting bar 2, the arms 3 of the element projecting inwardly in the direction of the hub A. The free ends of the arms 3 are screw-threaded. Each housing G comprises a pair of cylinders 4 fully closed at their outer ends and fully open at their inner ends. The cylinders 4 are united by a web 5 provided with an opening 6 for the reception of the outer connected ends of the members of each spoke. The arms 3 of each attaching element E are located in the cylinders 4 of each housing, the arms passing through openings 7 formed in the closed ends of the cylinders. The springs F are mounted in the cylinders 4 between plates 8 mounted upon the arms 3 and the closed ends of the cylinders, said plates being secured in applied position by nuts 9 mounted upon the threaded ends of the arms 3. The tensions of the springs F may be regulated through the medium of the nuts 9.

As the attaching elements E are secured to the felly C, as the housings G are secured to the spokes B, and as the springs F are interposed between the elements E and the housings G, the felly C is resiliently mounted upon the spokes B. As the felly C is resiliently mounted upon the spokes B, the wheel possesses the resilient qualities of a pneumatic tire. To give to the wheel the traction qualities of a pneumatic tire, the tire D is constructed of rubber.

Having thus fully described the invention what is claimed as new is:

A wheel comprising a hub, spokes secured to the hub, a pair of cylinders secured to the outer end of each spoke, the outer closed ends of the cylinders being provided with openings, U-shaped attaching elements secured to the inner side of the felly, the arms extending into the cylinders through the openings in the closed ends thereof, the free ends of the arms being screw-threaded, nuts mounted upon the threaded ends of the arms, plates mounted upon the arms between the closed ends of the cylinders and the nuts, and expansible coiled springs mounted upon the arms between the plates and the closed ends of the cylinders.

In testimony whereof I affix my signature in presence of two witnesses.

JOHN H. LAU.

Witnesses:
    J. A. ALEXANDER,
    LEWIS KINTER.